United States Patent Office 2,835,839
Patented May 20, 1958

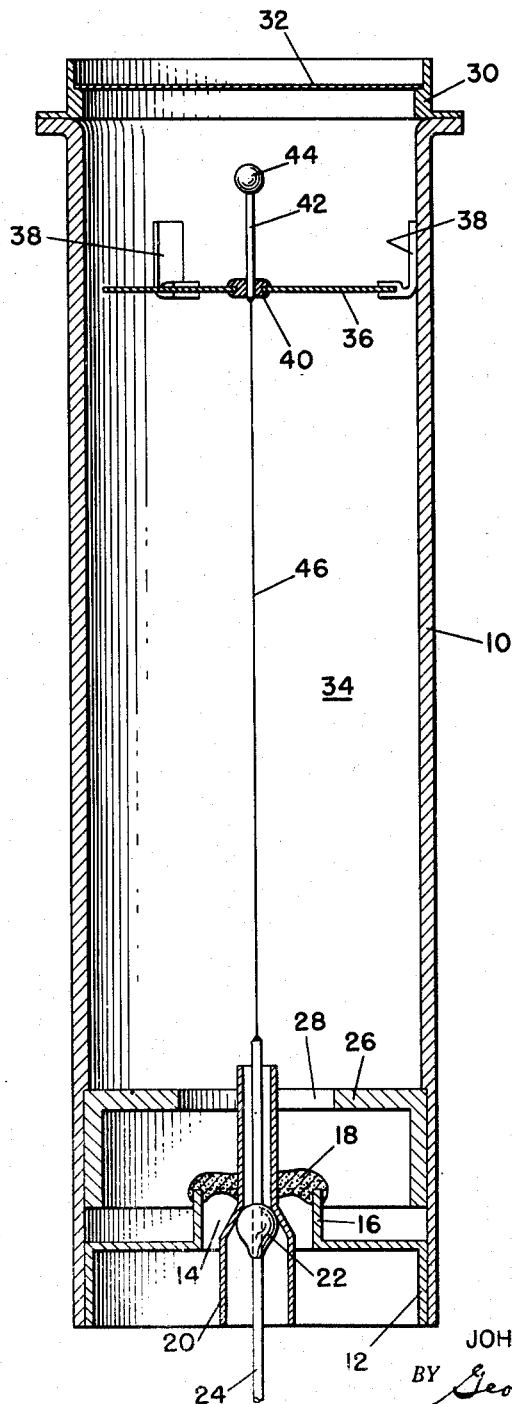

2,835,839

WIDE RANGE PROPORTIONAL COUNTER TUBE

John J. Borzin, Newark, N. J., assignor, by mesne assignments, to the United States of America as represented by the Secretary of the Navy Application May 31, 1955, Serial No. 512,340

6 Claims. (Cl. 313—93)

This invention relates to apparatus for measuring radiation intensity levels from radioactive materials, and in particular to an improved proportional counter tube capable of measuring intensities of gamma and beta radiation over a wide range of intensity levels.

In the past, three instruments have been required to measure radiation intensity levels over the range of from 0.05 to 500 Roentgens per hour. A Geiger Mueller counter having a large gas amplification factor was used for measuring low radiation intensity levels; a proportional counter having a lower gas amplification factor was used for medium levels of intensity of radiation; and an ionization chamber was used for measuring high radiation intensity levels.

It is, therefore, an object of this invention to provide an improved proportional counter tube which can measure radiation intensity levels over a wide range of values.

It is a further object of this invention to provide an improved proportional counter tube which can measure intensities of beta and gamma radiation over a wide range of values.

It is still a further object of this invention to provide an improved and accurate proportional counter tube capable of measuring radiation intensities from a source, or sources, of beta and gamma radiation having radiation intensities varying from substantially 0.05 Roentgen per hour to 500 Roentgens per hour.

Other objects and advantages of the invention will hereinafter become more fully apparent when considered in connection with the accompanying longitudinal section of the proportional counter tube.

A portion of the outer casing, or envelope, of the proportional counter tube is formed by hollow cylinder 10, which can be made of brass or stainless steel. Flanged header plate 12 is secured within one end of cylinder 10 by a seam weld, in a preferred example. A central space 14 is provided by inwardly extending annular flange 16, which is formed on the header plate 12. Insulator 18 centrally positions hollow guard ring 20 within opening 14 and electrically insulates guard ring 20 from header plate 12 and cylinder 10. Insulator 22 positions anode lead 24 centrally within guard ring 20 and electrically insulates lead 24 from ring 20. Header plate 12, insulator 18, guard ring 20, insulator 22 and anode lead 24 are fixedly secured together to form a gas tight seal across the lower end of cylinder 10.

Metallic shield 26 is secured within cylinder 10 to flatten the response of the counter over the whole sensitive anode region. A portion of the guard ring 20 extends through the central opening 28 formed in shield 26.

The upper end of cylinder 10 is sealed by a metallic ring 30 which is welded to the cylinder 10, and by membrane 32 which is secured to ring 30. Membrane 32 is made from a thin sheet of a suitable material which has low absorption, or minimum attenuation for beta radiation such as aluminum. Membrane 32 is secured to ring 30 by brazing in a preferred form of construction. The interior of cylinder 10 between membrane 32 and header plate 12 forms chamber 34. The components forming chamber 34 are secured together so that chamber 34 is hermetically sealed.

Support 36 is made of an electrical insulator, such as mica, and is secured to the inner wall of cylinder 10 by suitable means such as brackets 38. Eyelet 40 is mounted in a central opening which is formed in support 36. Anode 42 is welded to eyelet 40 and extends along the longitudinal axis of cylinder 10 from support 36 toward membrane 32. Anode 42 is made, in a preferred form, of stainless steel wire which is 0.025 of an inch in diameter and ½ of an inch in length. The diameter of anode 42 is chosen large enough so that it is sufficiently rigid so as not to move and thus not produce microphonics when mounted at only one end. Glass bead 44 is secured to the unsupported end of anode 42 so that a substantially uniform electrical field will extend around all of anode 42.

Anode 46 is made, in a preferred form, of stainless steel wire which is 0.005 of an inch in diameter and 4¹⁄₁₆ inches in length. One end of anode wire 46 is welded to anode lead 24 and the other end is welded to eyelet 40 so that anodes 42 and 46 are electrically interconnected. Anode 46 is mounted so as to coincide substantially with the longitudinal axis of cylinder 10. In order to produce the highest possible gain for low radiation intensities a very thin anode wire is desirable since the electrical field around the wire increases as the diameter of the wire decreases. An increase in the electric field increases the quantity of current produced per pulse so that the counting equipment associated with the counter tube will respond accurately to each pulse produced by incident gamma and beta radiation. By supporting anode 46 at both ends microphonics due to movement of anode 46 when the counter tube is subjected to acceleration is avoided.

In order to prevent production of photo electrons from the gas mixtures used to fill chamber 34, all light is excluded from chamber 34. To facilitate the exclusion of light, re-entrant seal construction is used in making proportional counter tube illustrated.

Chamber 34 is filled with a suitable gas at a predetermined pressure. When the counter is to be used, the potentials of anodes 42, 46 are made positive with respect to cylinder 10 which is normally maintained at ground potential by suitable conventional means which is not illustrated. The magnitude of the voltage between anodes 42, 46 and cylinder 10 is selected in order to obtain the desired operating characteristics for the proportional counter. The magnitude of the voltage is related to the type of gas used to fill the chamber 34 and its pressure, as is well known in the art.

If the proportional counter tube is held so that membrane 32 is close to a source of beta radiation and substantially normal to the radiation, a large proportion of the beta particles emitted will enter into chamber 34. Each beta particle, or electron, will ionize the gas within chamber 34 primarily in that part between membrane 32 and support 36. Each time the gas within chamber 34 is ionized, current will flow through the circuit which maintains the potential difference between anodes 42, 46 and cylinder 10. The short pulses of current flow are counted by conventional equipment which is not illustrated.

When the proportional counter tube is held with membrane 32 nearest a source of gamma radiation, each gamma ray while traveling within chamber 34 will, if it collides with an orbital electron of an atom of the gas within chamber 34, knock the orbital electron out and ionize the gas to produce a pulse. Since the radiation will be traveling in a direction substantially parallel to anodes 42, 46, the length of cylinder 10 in this direction will increase the probability that each gamma ray will ionize the gas within chamber 34. If the source of radiation provides both beta and gamma radiation, the magnitudes of each can be determined by noting the difference between the number of counts per unit time when membrance 32 is covered with a material which prevents substantially all beta radiation from entering chamber 34, and the number of counts when the cover is removed.

Obviously many modifications and variations of the present invention are possible in the light of the above teachings. It is therefore to be understood that within the scope of the appended claims the invention may be practiced otherwise than as specifically described.

What is claimed is:

1. A proportional counter tube comprising a hermetically sealed chamber, a portion of the walls of said chamber being formed from a material that has low absorption characteristics for beta radiation, a first short wire anode, means for mounting the first anode near the portion of the wall of the chamber having low absorption characteristics for beta radiation, a second relatively long thin wire anode the diameter of the second anode being substantially ⅕ that of the first anode, and means for supporting both ends of the second anode within the chamber, whereby said counter tube can measure beta and gamma radiation intensity levels of from .05 Roentgen per hour to 500 Roentgens per hour.

2. A proportional counter tube comprising a hollow cylinder, a flanged header plate having an annular flange mounted in one end of the cylinder, a guard ring mounted within the annular flange of the header plate and insulated from the annular flange, an anode lead mounted within the guard ring and insulated from the guard ring, a thin membrane of metal having small attenuation for beta radiation mounted in the other end of the cylinder, the interior of the cylinder between the header plate and the membrane forming a hermetically sealed chamber, a support mounted within the chamber, a first anode made of thin wire extending from the anode lead to the support, a second anode made of thicker wire mounted on said support and extending toward the membrane, said first and second anodes being electrically interconnected.

3. A proportional counter tube comprising a hollow cylinder, a flanged header plate having an annular flange, said plate being mounted in one end of the cylinder, a guard ring, a first insulator, said first insulator mounting the guard ring within the annular flange, an anode lead, a second insulator, said second insulator mounting the anode lead within the guard ring, a thin membrane of metal having small attenuation for beta radiation mounted in the other end of the cylinder, the interior of the cylinder between the header plate and the membrane forming a hermatically sealed chamber, a support mounted within the chamber, a first anode made of a relatively long thin wire and extending from the anode lead to the support, a second anode made of relatively short thick wire mounted on said support and extending toward the membrance, said first and second anodes being electrically interconnected.

4. A wide range high sensitivity proportional counter tube comprising a hollow brass cylinder, a flanged brass cylinder plate having an annular flange formed in the center of the header, said header being welded in one end of the cylinder, a guard ring mounted centrally within the annular flange of the cylinder and electrically insulated therefrom, an anode lead mounted centrally within the guard ring and electrically insulated therefrom, a flanged metal shield having a central opening mounted within the cylinder, said shield being so located that a portion of the guard ring extends through the opening of said shield, a thin alumnium membrane mounted in the other end of the cylinder, the interior of the cylinder between the membrane and the cylinder plate forming a hermetically sealed chamber, a support member made of mica mounted within the chamber center, a first thin wire anode extending from the anode lead to the support member, a second thicker wire anode mounted on the support member and extending toward the thin membrane, said first and second anodes being electrically interconnected.

5. A proportional counter tube comprising walls forming a hermetically sealed chamber having spaced end portions, one end portion of said chamber being provided with a material having minimum attentuation for beta radiation, a support mounted within said one end portion of the chamber, a first anode of thin wire disposed axially of said chamber, a second anode wire of greater cross section than the first anode wire fixed to one end of the first anode wire and both said anodes being carried by said support, an anode lead fixed to the other end of the first anode wire and disposed within the other end portion of the chamber and said first and second anodes and said anode lead all being electrically insulated from the chamber.

6. Apparatus as in claim 5 further characterized by the first and second anode wires being respectively of approximately 0.005 inch and 0.025 inch in diameter while the length of said first anode wire is substantially eight times that of the said second anode wire.

References Cited in the file of this patent

UNITED STATES PATENTS

| | | |
|---|---|---|
| 1,059,095 | Whitehead | Apr. 15, 1913 |
| 2,457,781 | Metten et al. | Dec. 28, 1948 |
| 2,542,440 | Victoreen et al. | Feb. 20, 1951 |
| 2,649,554 | Anton | Aug. 18, 1953 |